(12) United States Patent
Osnato et al.

(10) Patent No.: US 8,069,399 B2
(45) Date of Patent: Nov. 29, 2011

(54) METHOD AND SYSTEM FOR DECODING SIGNALS, CORRESPONDING RECEIVER AND COMPUTER PROGRAM PRODUCT

(75) Inventors: Fabio Osnato, Milan (IT); Devis Gatti, Vigevano (IT); Alessandro Tomasoni, Lesmo (IT)

(73) Assignee: STMicroelectronics, S.r.l., Agrate Brianza (MI) (IT)

( * ) Notice: Subject to any disclaimer, the term of this patent is extended or adjusted under 35 U.S.C. 154(b) by 1015 days.

(21) Appl. No.: 11/450,920

(22) Filed: Jun. 9, 2006

(65) Prior Publication Data

US 2007/0033476 A1 Feb. 8, 2007

(30) Foreign Application Priority Data

Jul. 21, 2005 (EP) .................................. 05425526

(51) Int. Cl.
*H03M 13/03* (2006.01)
*G06F 11/00* (2006.01)
(52) U.S. Cl. ........................................ 714/786; 714/746
(58) Field of Classification Search .................. 714/786, 714/795, 746, 758, 723; 375/262, 341, 340, 375/350, 316, 328, 343
See application file for complete search history.

(56) References Cited

U.S. PATENT DOCUMENTS

| | | | |
|---|---|---|---|
| 5,305,008 A | | 4/1994 | Turner et al. |
| 5,329,547 A | * | 7/1994 | Ling ............................. 370/342 |
| 5,379,306 A | * | 1/1995 | Noma et al. ................... 714/792 |
| 5,757,847 A | * | 5/1998 | Durrant et al. ................ 375/150 |
| 6,144,711 A | | 11/2000 | Raleigh et al. |
| 6,477,661 B2 | * | 11/2002 | Yamanaka et al. ................ 714/1 |
| 6,496,954 B1 | * | 12/2002 | Ono ............................. 714/795 |
| 7,302,018 B2 | * | 11/2007 | Onggosanusi et al. ....... 375/340 |
| 7,342,981 B2 | * | 3/2008 | Wongwirawat et al. ...... 375/326 |
| 7,372,802 B2 | * | 5/2008 | Breiling et al. ............... 370/206 |
| 7,433,432 B2 | * | 10/2008 | Hoo ............................. 375/347 |
| 2003/0087622 A1 | | 5/2003 | Jayaraman et al. |

(Continued)

FOREIGN PATENT DOCUMENTS

WO WO 03/047118 A 6/2003

OTHER PUBLICATIONS

Partial European Search Report for EP 05 42 5526 dated Dec. 15, 2005.

(Continued)

*Primary Examiner* — Phung M Chung
(74) *Attorney, Agent, or Firm* — Lisa K. Jorgenson; Kevin D. Jablonski; Graybeal Jackson LLP

(57) ABSTRACT

A method and system for decoding signals includes a transmitter configured for transmitting signals encoded with a mapping, with different and separable configurations in a real part and an imaginary part of the signal. The signals may be encoded according to a Gray or QAM mapping, and may be transmitted on a selective MIMO channel and/or multiplexed with an OFDM technique. The corresponding receiver is configured for decoding the real part and the imaginary part of the signals separately, and may include a filter for subjecting the encoded signals to a Wiener filtering and a MMSE detector for minimizing the mean-square error between the encoded signals and the result of the Wiener filtering. The receiver may also include a soft decoder for performing a soft estimation of the signals and cancelling, using the results of the soft estimation, an interference produced on the signals.

26 Claims, 8 Drawing Sheets

U.S. PATENT DOCUMENTS

2005/0047518 A1    3/2005    Auer

OTHER PUBLICATIONS

Ito T et al: "Performance comparison of MF and MMSE combined iterative soft interference canceller and V-Blast technique in MIMO/OFDM systems" Vehicular Technology Conference, 2003. VTC 2003-Fall. 2003 IEEE 58$^{th}$ Orlando, FL, USA Oct. 6-9, 2003, Piscataway, NJ, USA, IEEE, US, Oct. 6, 2003, pp. 488-492, XP010701011.

D. Zuyderhoff, X. Wautelet, A. Dejonghe, and L. Vandendorpe, "MMSE turbo receiver for space-frequency bit-interleaved coded OFDM", IEEE Vehicular Technology Conference, 2003.

* cited by examiner

METHOD AND SYSTEM FOR DECODING SIGNALS, CORRESPONDING RECEIVER AND COMPUTER PROGRAM PRODUCT

PRIORITY CLAIM

The present application claims the benefit of European Patent Application No. 05425526.0, filed Jul. 21, 2005, which application is incorporated herein by reference in its entirety.

TECHNICAL FIELD

An embodiment of the present disclosure relates to signal-decoding techniques.

BACKGROUND

Wireless Local Area Networks (W-LANs) have become a widespread technology on the telecommunications market for providing a wide-band connectivity between computers and other electronic devices. W-LANs are currently deployed in various environments, for example industrial companies and public and residential premises, in so far as they enable a high-speed data access for users. The most recent standards, IEEE 802.11a and 802.11 g, are able to provide transmission rates of up to 54 Mb/s, exploiting, as technology for the physical layer (PHY), a technique of Orthogonal Frequency Division Multiplexing (OFDM) and a Bit-Interleaved Coded Modulation (BICM) on 5.2 GHz and 2.4 GHz, respectively. However, the demand for high-rate services for data is continuously growing, and a wider range of coverage is much appreciated in these types of applications. These factors are currently leading to the definition of a new W-LAN standard based upon an innovative technology capable of improving the performance of the entire system.

The adoption of OFDM reduces the complexity of equalization at the expense of a partial loss in bandwidth due to cyclic prefix insertion.

Thanks to pseudo-random bit interleaving, in order to de-correlate successive encoded bits the channel encoder and the QAM modulator (QAM—Quadrature Amplitude Modulation) can be selected independently, thus providing the possibility of different system configurations.

Multiple-Input/Multiple-Output (MIMO) radio interfaces have been studied in depth over the last few years, and have been widely considered as a suitable solution for improving the performance of modern wireless communication systems. The joint use of MIMO and OFDM techniques, in combination with a Space-Frequency Bit-Interleaved-Coded-Modulation (SF-BICM) architecture, as described in D. Zuyderhoff, X. Wautelet, A. Dejonghe, and L. Vandendorpe, "MMSE turbo receiver for space-frequency bit-interleaved coded OFDM", IEEE Vehicular Technology Conference, 2003, which is incorporated by reference has proven able to provide a high data rate and simultaneously a mitigation of the effects of channel fades.

New-generation W-LAN systems, in addition to guaranteeing an ever-faster data rate, should also guarantee higher levels of performance in terms of system reliability. These factors lead to adopting, at the receiver end, innovative, yet at the same time sophisticated, techniques of decoding and detection, such as, for example, ones based upon the "turbo"-MIMO principle.

To concentrate on the aspect of detection, the optimal technique is based upon the MAP algorithm, which maximizes the a-posteriori probability (MAP—Maximum A-posteriori Probability). The MAP algorithm may, however, not be physically implementable, above all when combined with a high order of modulation, as in the case of 64-QAM.

In fact, by adopting more than one antenna at both the transmitter end and the receiver end, the computational complexity is found to grow exponentially with the order of modulation and also with the number of transmitting antennas.

Consequently, in order to cope with questions of complexity and performance, sub-optimal schemes have been proposed, based upon simpler detectors, such as Minimum-Mean-Square-Error (MMSE) detectors to be used in iterative decoding and detection schemes instead of the MAP algorithm, which, as has been said, maximizes the a-posteriori probability. However, even using MMSE detectors, the computational complexity increases proportionally with the number of iterations, with a consequent major impact also on the latency constraints. Finally, also the constraints on the size of the memory can become a significant aspect especially at the user-terminal end.

SUMMARY

From the foregoing description of the current situation, there exists a need to define solutions that enable exploitation of the advantages linked to MIMO techniques, without this entailing any increase in the computational, and hence, circuit complexity, which may render impractical the application of these techniques in widespread application contexts.

In accordance with an embodiment of the present disclosure, a method that meets this need is provided. Embodiments of the present disclosure also relate to a corresponding system, the corresponding receiver, as well as a computer-program product, loadable into the memory of at least one computer, and comprises software code portions for implementing the aforesaid method. As used herein, the reference to such a computer-program product is understood as being equivalent to the reference to a computer-readable medium containing instructions for controlling a computer system for the purpose of coordinating execution of a method according to an embodiment. The reference to "at least one computer" is intended to highlight the possibility for an embodiment of the present disclosure to be implemented in a distributed and/or modular way.

BRIEF DESCRIPTION OF THE DRAWINGS

One or more embodiments will now be described, by way of non-limiting example, with reference to the drawings.

DETAILED DESCRIPTION

The exemplary embodiments described herein have the purpose of reducing the complexity of a turbo-MIMO-MMSE reference scheme, targeting a significant reduction in the number of computations of the main blocks used in the iterative detection process. In particular, the main blocks are a soft-interference estimator (SIE), a MMSE detector, and the QAM soft de-mapper. The first two blocks are simplified by exploiting, respectively, Gray coding and the properties of matrix algebra, without introducing any approximation with respect to the formulas proposed in the literature. Instead, the last block has been simplified by proposing an appropriate method that approximates the calculation of the log-likelihood ratio (LLR) with respect to the standard computational method.

In particular, consider a scenario with T antennas at the transmitter end and R antennas at the receiver end. Then suppose that a stream of 1000-byte data packets is generated in a W-LAN. The stream is encoded with a 64-state ½-rate convolutional encoder, subjected to interleaving and mapped on an N-QAM Gray constellation (with N=4, 16, 64, . . . ). The physical framing format of the packet is generated in accordance with the specifications of the W-LAN standard 802.11a but imposing that the number S of OFDM symbols for transmission on the air should be a multiple of the number T of antennas at the transmitter end and adopting for the data a number of subcarriers equal to 56.

Figure 1:
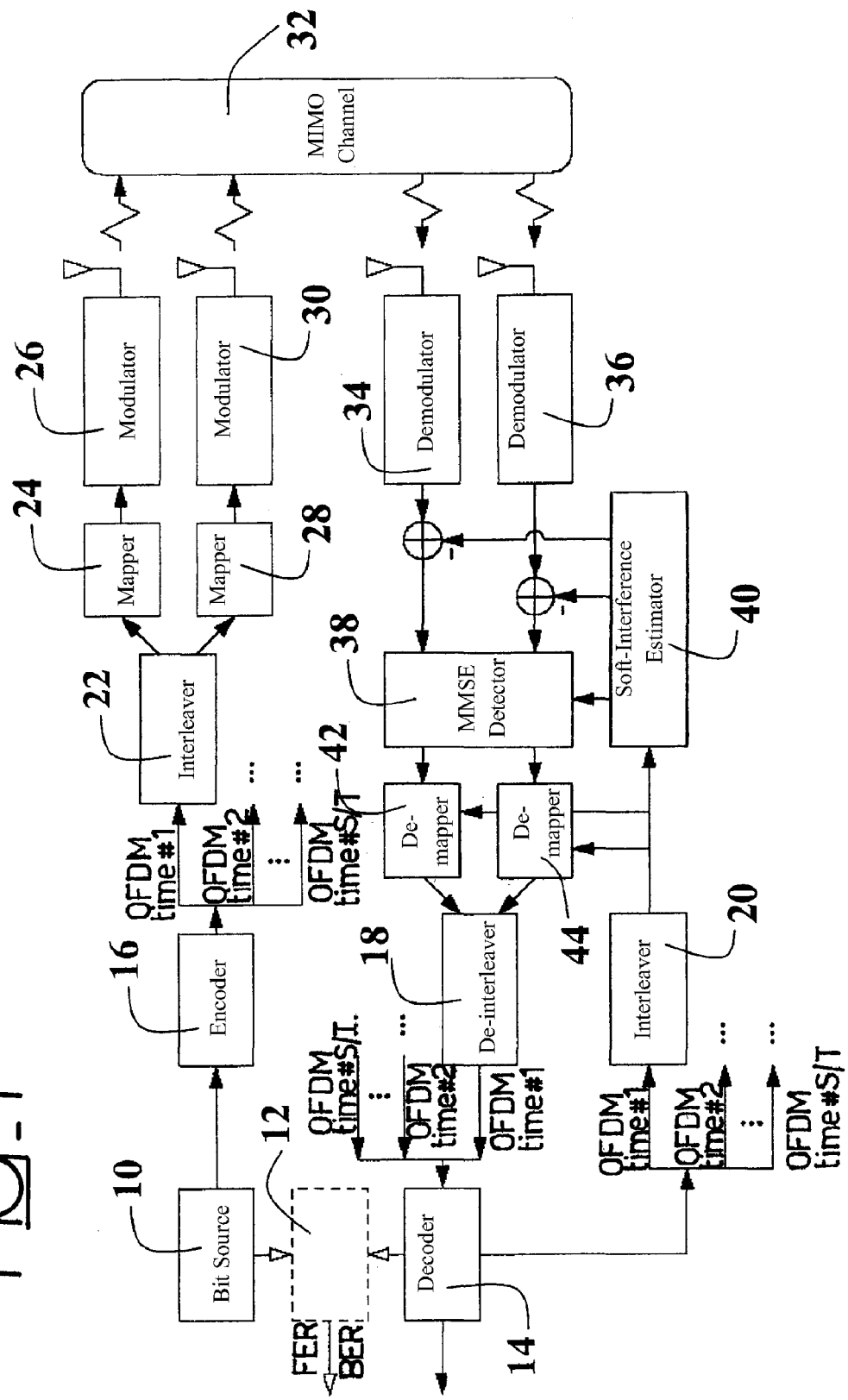
FIG. 1 shows an example of a block diagram of a system in which the solution described herein is applied according to an embodiment.

The block diagram illustrated in FIG. 1 summarizes the main operations applied on a W-LAN-packet in the case where the number of antennas at the transmitter end T is 2, and the number of antennas at the receiver end R is 2. Of course, any extension to a larger number of antennas is straightforward.

A MIMO frequency-selective channel is represented by the matrix $H^{(f)} \in C^{R \times T}$:

$$H^{(f)} = [\, h_1^{(f)} \;\; h_2^{(f)} \;\; \cdots \;\; h_T^{(f)} \,] \tag{1}$$

where f=1, 2, . . . , F is the frequency index, $h_t^{(f)}$ are column vectors, the elements of which $h_{r,t}^{(f)}$ represent the paths between the transmitter t and the receiver r, at the f-th tone. These elements are normalized as follows:

$$\frac{1}{F}\sum_{f=1}^{F} E[|h_{r,t}^{(f)}|^2] = 1 \tag{2}$$

with t=1, 2 . . . , T, and r=1, 2, . . . , R. The channel coefficients $h_{r,t}$ are generated, according to the indoor MIMO channel model, for environments with high levels of scattering.

For reasons of simplicity, the index f is omitted in the remaining part of the description in so far as OFDM enables consideration of each tone independently of the others. Hence, all the equations appearing from this point on will be referred to a single OFDM data tone. In this way, the signal received can be written as follows:

$$y = Hx + n \tag{3}$$

where $$x = \begin{bmatrix} x_1 \\ x_2 \\ \vdots \\ x_T \end{bmatrix} \in C^T \tag{4}$$

$$y = \begin{bmatrix} y_1 \\ y_2 \\ \vdots \\ y_R \end{bmatrix} \in C^R$$

are the vectors of the symbols transmitted and received respectively, and $$n = \begin{bmatrix} n_1 \\ n_2 \\ \vdots \\ n_R \end{bmatrix} \in C^R \tag{5}$$

is a white-Gaussian-noise vector with components that are independent and identically distributed with a covariance matrix:

$$R_n = E[nn^H] = \sigma_N^2 I \tag{6}$$

($n^H$ denotes the Hermitian, or conjugate transpose, operator applied to the vector n). The transmitted N-QAM symbols are uncorrelated, with zero mean value and normalized variance $\sigma_x^2 = 1$ for each transmitting antenna, namely:

$$R_x = E[xx^H] = \sigma_x^2 I = I \tag{7}$$

Therefore, starting from Eqs. (6) and (7), the signal-to-noise ratio (SNR) transmitted is equal to $$SNR_{TX} = \frac{T}{\sigma_N^2} \tag{8}$$

With reference to FIG. 1, a random source of bits 10 sends the bits generated to a convolutional encoder 16. The encoded bits are grouped together in blocks OFDM1, OFDM2, . . . , OFDMS/T and sent to a space-frequency (SF) bit interleaver 22, which applies the same law to each block. At output from the interleaving block 22 the signal is forwarded to two QAM mappers 24, 28 in amplitude quadrature, which in turn forward the outputs to OFDM modulators 26, 30.

The signals generated by the OFDM modulators 26, 30 are transmitted on a MIMO channel 32.

At the receiver end, two OFDM demodulators 34, 36 receive the signals from the channel 32.

The demodulators 34, 36 forward the signals received to a MMSE detector 38, with which a soft-interference estimator (SIE) 40 is associated.

The QAM demodulators 42, 44 send their signals to a space-frequency bit de-interleaver 18, which generates a plurality of signals OFDM1, OFDM2, . . . , OFDMS/T.

This plurality of signals is sent at input to a convolutional decoder 14, which generates a bit stream at output. This bit stream can be sent at input to a module 12, which executes the bit-to-bit comparison and generates the parameters of bit error rate (BER) and frame error rate (FER).

The decoder 14 returns the decoded bits and, through a feedback loop, supplies a space-frequency bit interleaver 20, which in turn supplies the data to the soft-interference estimator 40.

As appears from FIG. 1, the estimated interference is subtracted from the previously de-modulated signals. The linear detector calculates the estimates $\hat{x}_t$ of each symbol transmitted $x_t$.

If a perfect channel-state information (CSI) is assumed at the receiver end, the de-mapper, using the estimates $\hat{x}_t$, calculates the log-likelihood ratios (LLRs) $\lambda_t(m)$ of the encoded bits, where $m=1, 2, \ldots, M$, and $M=\log_2(N)$ is the order of modulation. These soft values are passed on to the de-interleaver and then to a SOVA decoder (SOVA—Soft Output Viterbi Algorithm). The SOVA decoder generates not only decisions on the bits of the data, but moreover generates extrinsic information $\xi_t(m)$ with $m=1, 2, \ldots, M$ corresponding to the encoded bits. This extrinsic information is used as a-priori knowledge at the detector end, after the bit-interleaving process, to carry out a soft-interference cancellation (SIC).

In this way, the MMSE detector 38 supplies more reliable estimates of the symbol $x_t$ transmitted, with $t=1, 2, \ldots, T$, drawing advantage from the soft information fed back by the channel decoder to the input of the MMSE detector 38. Furthermore, the process of de-mapping also takes into account the a-priori probability $\xi_t(m)$ for updating the LLR values $\lambda_{(m)}$ that will be used in the new decoding process.

For immediate reference, described hereinafter are the classic approach and the low-complexity approach of the system of soft-interference cancellation described herein We shall define a function $\text{bit}_m[x(n)]$, $m=1, 2, \ldots, M$, where M is the degree of modulation. This function returns at output a value $\{0,1\}$ corresponding to the m-th bit of the symbol $x(n)$, $n=1, 2, \ldots, N$ of an N-QAM constellation.

By exploiting the extrinsic information of the LLR, as supplied by the SOVA decoder $$\xi_t(m) = \ln \frac{P[\text{bit}_m(x_t) = 1]}{P[\text{bit}_m(x_t) = 0]} \quad (9)$$

of the encoded bits, a soft-interference estimator (SIE) calculates soft estimates of the symbols transmitted by the t-th antenna, with $t=1, 2, \ldots, T$ $$\tilde{x}_t = E[x_t] \, m=1, 2, \ldots, M \quad (10)$$

Assuming that the bits within a symbol are statistically independent of one another, the probability $P[x_t=x(n)]$ can be expressed as $$P_t(n) = P[x_t = x(n)] \quad (11)$$
$$= \prod_{m=1}^{M} \frac{\exp\{\text{bit}_m[x(n)]\xi_t(m)\}}{1 + \exp[\xi_t(m)]}$$

At the start of the iterative process, $\xi_t(m)=0$ for every m and t; as a consequence, all the symbols are equally likely, and their probability $P_t(n)$ is equal to $2^{-M}$.

Consequently, the soft-estimates $$\tilde{x}_t = E[x_t] \quad (12)$$
$$= \sum_{n=1}^{N} [x(n) P_t(n)]$$

are equal to zero, and no cancellation is performed in the first iteration.

In the subsequent iterations, since the reliability of the bits supplied by the SOVA decoder increases, the soft-estimates become closer to their true values, and for the t-th antenna, the soft-estimates of the symbols coming from the other (T−1) interfering antennas are cancelled to obtain $$z_t = y - \sum_{i \neq t} h_i \tilde{x}_i \quad (13)$$
$$= y - H\tilde{x}_{\bar{t}}$$

where $\tilde{x}_{\bar{t}}$ is the column vector with the soft-estimates, except for the t-th element, equal to zero.

In addition to calculating $Z_t$, also the error covariance matrix is calculated as $$R_{\tilde{e}_t} = E[\tilde{e}_t \tilde{e}_t^H] \quad (14)$$
$$= \text{diag}[\sigma_{\tilde{e}_1}^2 \cdots \sigma_{\tilde{e}_{t-1}}^2 \ 1 \ \sigma_{\tilde{e}_{t+1}}^2 \cdots \sigma_{\tilde{e}_T}^2]$$

where $$\tilde{e}_t = x_t - \tilde{x}_t \quad (15)$$

and $$\sigma_{\tilde{e}_t}^2 = E[|\tilde{e}_t|^2]; \quad n = 1, 2, \ldots, N \quad (16)$$
$$= \sum_{n=1}^{N} [|x(n)|^2 P_t(n)] - |\tilde{x}_t|^2$$

It may be seen from Eqs. (12) and (16) that the probability $P_t(n)$ is calculated N times for each transmitting antenna and is multiplied N times by the corresponding QAM symbol and also by its energy.

The solution described in what follows enables a lower complexity for the system of soft-interference cancellation to be obtained.

Basically, the goal is to reduce the operations performed in expressions (12) and (16). This can be done by regarding the Gray mapping as a combination of two $\sqrt{\sqrt{N}}$-PAMs along the real and imaginary axes.

Figure 2:
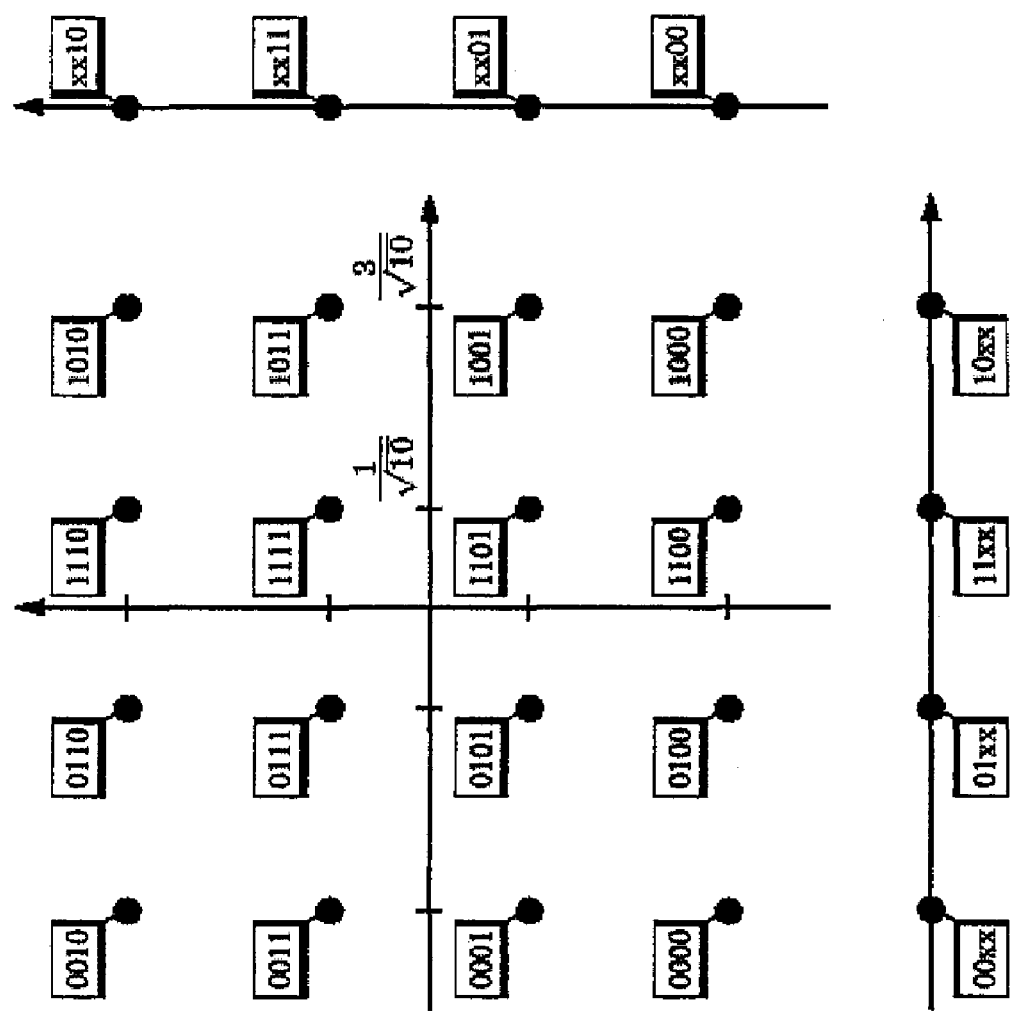
FIG. 2 shows an example of mapping of the symbols for 16-QAM Gray coding obtained as a combination of two 4-PAM Gray mappings (PAM—Pulse-Amplitude Modulation) according to an embodiment.

The 16-QAM constellation of FIG. 2 is obtained as a superposition of two 4-PAM mappings. The first, along the real axis, identifies the first two bits of the label associated with the symbols of the constellation. In the same way, the 4-PAM mapping along the imaginary axis identifies the last two bits of the label associated with the symbols of the constellation. Hence, Eqs. (12) and (16) can be computed separately for their real and imaginary parts. In this way, $\tilde{x}_t$ and $\sigma_{\tilde{e}_t}^2$ are obtained using only $\sqrt{N}$ probabilities for the real and imaginary parts, instead of N probabilities, as follows:

$$R(\tilde{x}_t) = E[R(x_t)], \; m = 1, 2, \ldots, \frac{M}{2} \qquad (17)$$

$$\Im(\tilde{x}_t) = E[\Im(x_t)], \; m = \frac{M}{2} + 1, \ldots, M \qquad (18)$$

$$\overline{R(\tilde{x}_t)^2} = E[R(x_t)^2], \; m = 1, 2, \ldots, \frac{M}{2} \qquad (19)$$

$$\overline{\Im(\tilde{x}_t)^2} = E[\Im(x_t)^2], \; m = \frac{M}{2} + 1, \ldots, M \qquad (20)$$

Therefore, $\tilde{x}_t$ and $\sigma_{\tilde{e}_t}^2$ can be written as $$\tilde{x}_t = R(\tilde{x}_t) + j\Im(\tilde{x}_t) \qquad (21)$$

$$\sigma_{\tilde{e}_t}^2 = \{\overline{R(\tilde{x}_t)^2} + \overline{\Im(\tilde{x}_t)^2}\} - |\tilde{x}_t|^2 \qquad (22)$$

It should be emphasized that this simplification functions not only for a Gray mapping, but also for other types of mappings that envisage a configuration that is different but can be separated into a real part and an imaginary part.

With reference to what has been seen previously, it is possible to define $$p_t^m(0) = P[bit_m(x_t) = 0] \qquad (23)$$
$$= \frac{1}{1 + \exp[\xi_t(m)]}$$

$$p_t^m(1) = 1 - p_t^m(0) \qquad (24)$$

where n=1, 2, ..., M/2.

In the normalized-power 16-QAM constellation of FIG. 2, assuming that the bits are mutually independent and proceeding as in Eq. (11)

$$P\left[R(x_t) = -\frac{3}{\sqrt{10}}\right] = p_t^1(0) p_t^2(0) \qquad (25)$$

$$P\left[R(x_t) = -\frac{1}{\sqrt{10}}\right] = p_t^1(0) p_t^2(1) \qquad (26)$$

$$P\left[R(x_t) = \frac{1}{\sqrt{10}}\right] = p_t^1(1) p_t^2(1) \qquad (27)$$
$$= [1 - p_t^1(0)][1 - p_t^2(0)]$$

$$P\left[R(x_t) = \frac{3}{\sqrt{10}}\right] = p_t^1(1) p_t^2(0) \qquad (28)$$
$$= [1 - p_t^1(0)] p_t^2(0)$$

it follows that expression (17) becomes $$R(\tilde{x}_t) = -\frac{3}{\sqrt{10}} P\left[R(x_t) = -\frac{3}{\sqrt{10}}\right] - \qquad (29)$$
$$\frac{1}{\sqrt{10}} P\left[R(x_t) = -\frac{1}{\sqrt{10}}\right] +$$
$$\frac{1}{\sqrt{10}} P\left[R(x_t) = \frac{1}{\sqrt{10}}\right] +$$

$$\frac{3}{\sqrt{10}} P\left[R(x_t) = \frac{3}{\sqrt{10}}\right]$$
$$= \frac{[1 - 2p_t^1(0)][1 + 2p_t^2(0)]}{\sqrt{10}}$$

Likewise, a similar equation is obtained considering Eq. (18), as given below:

$$\Im(\tilde{x}_t) = \frac{[1 - 2p_t^3(0)][1 + 2p_t^4(0)]}{\sqrt{10}} \qquad (30)$$

In the same way, Eqs. (19) and (20) can be written as $$\overline{R(\tilde{x}_t)^2} = \left(-\frac{3}{\sqrt{10}}\right)^2 P\left[R(x_t) = -\frac{3}{\sqrt{10}}\right] + \qquad (31)$$
$$\left(-\frac{1}{\sqrt{10}}\right)^2 P\left[R(x_t) = -\frac{1}{\sqrt{10}}\right] +$$
$$\left(\frac{1}{\sqrt{10}}\right)^2 P\left[R(x_t) = \frac{1}{\sqrt{10}}\right] +$$
$$\left(\frac{3}{\sqrt{10}}\right)^2 P\left[R(x_t) = \frac{3}{\sqrt{10}}\right]$$
$$= \frac{1 + 8p_t^2(0)}{10}$$

$$\overline{\Im(\tilde{x}_t)^2} = \frac{1 + 8p_t^4(0)}{10} \qquad (32)$$

Figure 3:
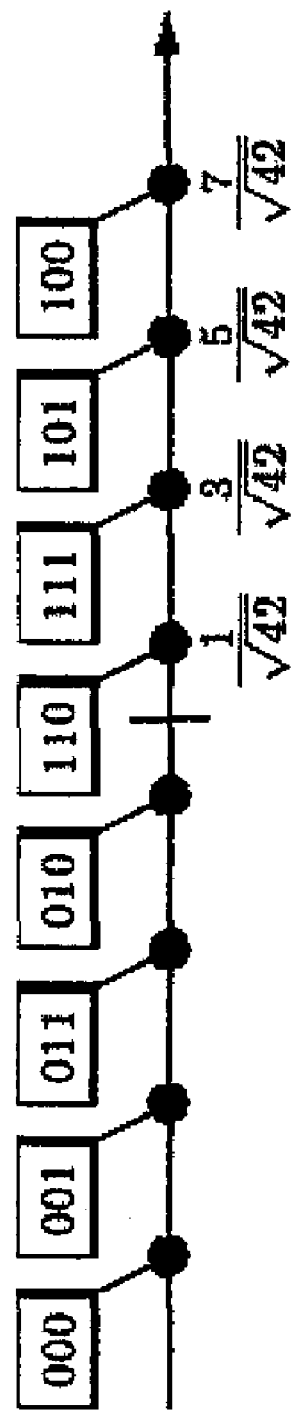
FIG. 3 shows an example of mapping of an 8-PAM Gray coding according to an embodiment.

Extending the same concept to a 64-QAM Gray mapping, it is possible to interpret this mapping as two 8-PAM modulations, as in FIG. 3, along the real and imaginary axes, to obtain $$R(\tilde{x}_t) = \frac{[1 - 2p_t^1(0)][4p_t^2(0) p_t^3(0) + 2p_t^2(0) - 2p_t^3 + 3]}{\sqrt{42}} \qquad (33)$$

$$\Im(\tilde{x}_t) = \frac{[1 - 2p_t^4(0)][4p_t^5(0) p_t^6(0) + 2p_t^5(0) - 2p_t^6(0) + 3]}{\sqrt{42}} \qquad (34)$$

$$\overline{R(\tilde{x}_t)^2} = \frac{32 p_t^2(0) p_t^3(0) + 16 p_t^2(0) - 8 p_t^3(0) + 9}{42} \qquad (35)$$

$$\overline{\Im(\tilde{x}_t)^2} = \frac{32 p_t^5(0) p_t^6(0) + 16 p_t^5(0) - 8 p_t^6(0) + 9}{42} \qquad (36)$$

To sum up, the symbol estimated by applying Eq. (12) can be directly calculated, avoiding expansion of expression (11) for each symbol transmitted.

Table 1 summarizes the computational costs, per data bit, of the interference cancellation for a system with T=2 and R=3 in the classic case (A) and in the low-complexity case (B) described herein. It has been assumed that the multiplications that involve powers of two do not involve significant costs and hence have not been considered.

TABLE 1

| | 16-QAM | | 64-QAM | |
|---|---|---|---|---|
| | A | B | A | B |
| MUL | 55 | 9.5 | 175.3 | 7.7 |
| SUM | 33.5 | 12 | 71.7 | 11.3 |
| DIV | 2 | 2 | 2 | 2 |
| EXP | 2 | 2 | 2 | 2 |
| CMP | 0 | 0 | 0 | 0 |

There will now be described, once again in a comparative way for immediate reference, how the classic approach and the low-complexity approach described herein result in the structure of the MMSE detector.

In the classic approach, a MMSE detector minimizes the mean-square error between the symbol transmitted $x_t$ and the output of the Wiener filter $\hat{x}_t$.

This filter is represented by a vector $w_t \in C^R$ such that $$\hat{x}_t = w_t^H z_t \tag{37}$$

where $z_t$ is the observation vector expressed in Eq. (13).

It can be shown that the MMSE filter is given by $$w_t = (\sigma_N^2 I + H R_{\tilde{e}_t} H^H)^{-1} h_t \tag{38}$$

where $\sigma_N^2$ is the noise power and $R_{\tilde{e}_t}$ is defined in Eq. (14).

The vector $w_t$ must be re-calculated for each transmitting antenna t and for each iteration, with consequent considerable computational costs.

The low-complexity approach described herein pursues, instead, the goal of reducing the computational cost of the formula that describes the Wiener filter.

This has been obtained by exploiting the Hermitian structure of $R_{\tilde{e}_t}$ (it is a real diagonal matrix) and a Woodbury formula, as follows:

$$\begin{aligned}
w_t &= (\sigma_N^2 I + H R_{\tilde{e}_t} H^H)^{-1} h_t \\
&= (\sigma_N^2 I + H R_{\tilde{e}_t} H^H)^{-1} H u_t \\
&= \left[\frac{1}{\sigma_N^2} I - \frac{1}{\sigma_N^2} H \left(I + \frac{1}{\sigma_N^2} R_{\tilde{e}_t} H^H H\right)^{-1} \cdot R_{\tilde{e}_t} H^H \frac{1}{\sigma_N^2}\right] H u_t \\
&= \left[\frac{1}{\sigma_N^2} H - \frac{1}{\sigma_N^2} H (\sigma_N^2 I + R_{\tilde{e}_t} H^H H)^{-1} \cdot R_{\tilde{e}_t} H^H H\right] u_t \\
&= \left\{\frac{1}{\sigma_N^2} H - \frac{1}{\sigma_N^2} H (\sigma_N^2 I + R_{\tilde{e}_t} H^H H)^{-1} \cdot [(R_{\tilde{e}_t} H^H H + \sigma_N^2 I) - \sigma_N^2 I]\right\} u_t \\
&= \left[\frac{1}{\sigma_N^2} H - \frac{1}{\sigma_N^2} H + H(\sigma_N^2 I + R_{\tilde{e}_t} H^H H)^{-1}\right] u_t \\
&= H(\sigma_N^2 I + R_{\tilde{e}_t} H^H H)^{-1} u_t
\end{aligned} \tag{39}$$

where $$u_t = \begin{bmatrix} 0 \\ \vdots \\ 0 \\ 1 \\ 0 \\ \vdots \\ 0 \end{bmatrix} \begin{matrix} \}t-1 \\ \\ \\ \\ \}T-t \end{matrix} \tag{40}$$

is the t-th unit vector of the T-dimensional space. The major advantages introduced by Eq. (39) are the following:

the matrix $R_{\tilde{e}_t}$ no longer appears between H and $H^H$, as in the formula (38); instead, the product $H^H H$ does not depend upon the variance of the symbols estimated, and can be calculated only once and used for each SIC iteration to detect all of the OFDM symbols belonging to the same W-LAN packet;

H and $H^H$ exchange their relative position. Since the number R of receiving antennas is generally equal to or greater than the number T of transmitting antennas, a matrix $(\sigma_N^2 I + R_{\tilde{e}_t} H^H H) \in C^{T \times T}$ must be inverted instead of a matrix $(\sigma_N^2 I + H R_{\tilde{e}_t} H^H) \in C^{R \times R}$, with $R \geq T$;

in expression (38) the complete computation of the inverse matrix $(\sigma_N^2 I + H R_{\tilde{e}_t} H^H)^{-1}$ is required for each t. Instead, in formula (39), $(\sigma_N^2 I + R_{\tilde{e}_t}^H H)^{-1}$ is multiplied by the unit vector $u_t$, so that it is sufficient to calculate only one column of the matrix for each t.

Finally, a further reduction of complexity of the detector block is obtained by defining $$A = H^H H \tag{41}$$

$$b = H^H y \tag{42}$$

so that expression (37) can be reformulated as $$\begin{aligned}
\hat{x}_t &= w_t^H z_t \\
&= \left[H(\sigma_N^2 I + R_{\tilde{e}_t} H^H H)^{-1} u_t\right]^H (y - H\tilde{x}_t) \\
&= u_t^H (\sigma_N^2 I + H^H H R_{\tilde{e}_t})^{-1} H^H (y - H\tilde{x}_t) \\
&= u_t^H (\sigma_N^2 I + H^H H R_{\tilde{e}_t})^{-1} (H^H y - H^H H \tilde{x}_t) \\
&= H(\sigma_N^2 I + A R_{\tilde{e}_t})^{-1} (b - A\tilde{x}_t)
\end{aligned} \tag{43}$$

In this way, the term $y - H\tilde{x}_t$ is replaced by $b - A\tilde{x}_t$, where $A \in C^{T \times T}$ (instead of $H \in C^{R \times T}$) and $b \in C^{T \times 1}$ (instead of $y \in C^{R \times 1}$).

Neither of these terms depends upon the symbol estimates $\tilde{x}_t$ so that they can be calculated at the start of the iterative-detection process and stored in a memory, to be used during the subsequent iterations.

Table 2 summarizes the computational costs of MMSE detection, per data bit, averaged over the transmission of S OFDM blocks, for a system with T=2 and R=3 in the classic case (A) and in the low-complexity case (B).

TABLE 2

| | 16-QAM | | 64-QAM | |
|---|---|---|---|---|
| | A | B | A | B |
| MUL | 103 | 20 | 68.7 | 13.3 |
| SUM | 73 | 10.5 | 48.7 | 7 |
| DIV | 1.5 | 1.5 | 1 | 1 |
| EXP | 0 | 0 | 0 | 0 |
| CMP | 0 | 0 | 0 | 0 |

There now follows a description, once again in a comparative way for direct reference, of the criteria of implementation of the classic approach and the low-complexity approach described herein for the de-mapping block.

The classic way of expressing the a-posteriori LLRs of the bits belonging to a symbol $x_t$ is $$\phi_t(m) = \ln\frac{P[bit_m(x_t) = 1/\hat{x}_t, \sigma^2_{\hat{x}_t}]}{P[bit_m(x_t) = 0/\hat{x}_t, \sigma^2_{\hat{x}_t}]} \qquad (44)$$

$$= \ln\frac{\sum_{n \in B_m(1)} \exp\{\varphi_n[\hat{x}_t, \sigma^2_{\hat{x}_t}, \xi_t(i)]\}}{\sum_{n \in B_m(0)} \exp\{\varphi_n[\hat{x}_t, \sigma^2_{\hat{x}_t}, \xi_t(i)]\}}$$

where $i, m = 1, 2, \ldots, M$, $\sigma^2_{\hat{x}t}$ is the variance of the estimate $\hat{x}_t$, $\xi_t(i)$ is the a-priori information defined in Eq. (9), and $B_m(1)$, $B_m(0)$ are the subsets of the QAM symbols, namely $$B_m(1) \subset [1, N] \subset \mathbb{N}: b \in B_m(1) \Rightarrow bit_m[x(b)] = 1 \qquad (45)$$

$$B_m(0) \subset [1, N] \subset \mathbb{N}: b \in B_m(0) \Rightarrow bit_m[x(b)] = 0 \qquad (46)$$

The metric representing the probability that a constellation symbol has been transmitted is $$\varphi_n[\hat{x}_t, \sigma^2_{\hat{x}_t}, \xi_t(i)] - \frac{|\hat{x}_t - x(n)|^2}{\sigma^2_{\hat{x}_t}} + \sum_{i=1}^{M} bit_i|x(n)|\xi_t(i) \qquad (47)$$

Said metric is obtained through the sum of two different contributions. The first contribution depends upon the symbol estimate $\hat{x}_t$, approximated as a Gaussian variable, supplied by the detector. The second contribution depends upon the a-priori information of expression (9) that comes from the SOVA decoder.

Therefore, the linear local regression $\phi_t(m)$ in expression (44) is obtained from the joint evaluation of both of the terms present in Eq. (47).

In order to avoid computation of N sums of exponential terms and a logarithmic operation, for each LLR it is common practise to approximate expression (44) by introducing the well-known and consolidated Max-Log-Map operator, which is obtained as follows:

$$\phi_t(m) \approx \ln\frac{\max_{n \in B_m(1)} \exp\{\varphi_n[\hat{x}_t, \sigma^2_{\hat{x}_t}, \xi_t(i)]\}}{\max_{n \in B_m(0)} \exp\{\varphi_n[\hat{x}_t, \sigma^2_{\hat{x}_t}, \xi_t(i)]\}}$$

$$\approx \max_{n \in B_m(1)} \{\varphi_n[\hat{x}_t, \sigma^2_{\hat{x}_t}, \xi_t(i)]\} - \max_{n \in B_m(0)} \{\varphi_n[\hat{x}_t, \sigma^2_{\hat{x}_t}, \xi_t(i)]\}$$

Finally, the extrinsic soft values at output from the detector are obtained by subtracting from expression (48) the a-priori information $\xi_t(m)$ coming from the SOVA decoder $$\lambda_t(m) = \phi_t(m) - \xi_t(m) \qquad (49)$$

In the low-complexity approach, the aim is to reduce the number of computations in expression (48) by proposing a solution that considers only a subset of the N metrics that the max operator would have taken into account for each linear local regression. The main idea is that, instead of maximizing the entire expression (47), the solution chooses between the metrics that separately maximize either $$-\frac{|\hat{x}_t - x(n)|^2}{\sigma^2_{\hat{x}_t}}$$

or $$\sum_{i=1}^{M} bit_i[x(n)]\xi_t(i).$$

The solution described herein defines two aims, namely, how to select the subsets and how to reduce the complexity of calculation of the metrics.

The first aim is achieved by introducing two criteria, referred to as distance criterion and a-priori-probability criterion. The second aim consists in the explicit computation of just one metric per subset, from which the other metrics can be obtained through a less costly differential method. Said method will be described in what follows.

The low-complexity approach for de-mapping the symbol can be formalized by means of the following relations:

$$\approx \max\{\varphi_j[\hat{x}_t, \sigma^2_{\hat{x}_t}, \xi_t(i)], \varphi_l[\hat{x}_t, \sigma^2_{\hat{x}_t}, \xi_t(i)]\} - \qquad (50)$$
$$\max\{\varphi_q[\hat{x}_t, \sigma^2_{\hat{x}_t}, \xi_t(i)], \varphi_g[\hat{x}_t, \sigma^2_{\hat{x}_t}, \xi_t(i)]\}$$

where j and q are selected according to the distance criterion:

$$j \in B_m(1): |\hat{x}_t - x(j)|^2 = \min_{n \in B_m(1)} |\hat{x}_t - x(n)|^2 \qquad (51)$$

$$q \in B_m(0): |\hat{x}_t - x(q)|^2 = \min_{n \in B_m(0)} |\hat{x}_t - x(n)|^2 \qquad (52)$$

and l and g according to the a-priori-probability criterion:

$$l \in B_m(1): \sum_{i=1}^{M} bit_i[x(l)]\xi_t(i) = \max_{n \in B_m(1)} \sum_{i=1}^{M} bit_i[x(n)]\xi_t(i) \qquad (53)$$

$$g \in B_m(0): \sum_{i=1}^{M} bit_i[x(g)]\xi_t(i) = \max_{n \in B_m(0)} \sum_{i=1}^{M} bit_i[x(n)]\xi_t(i) \qquad (54)$$

Figure 4:
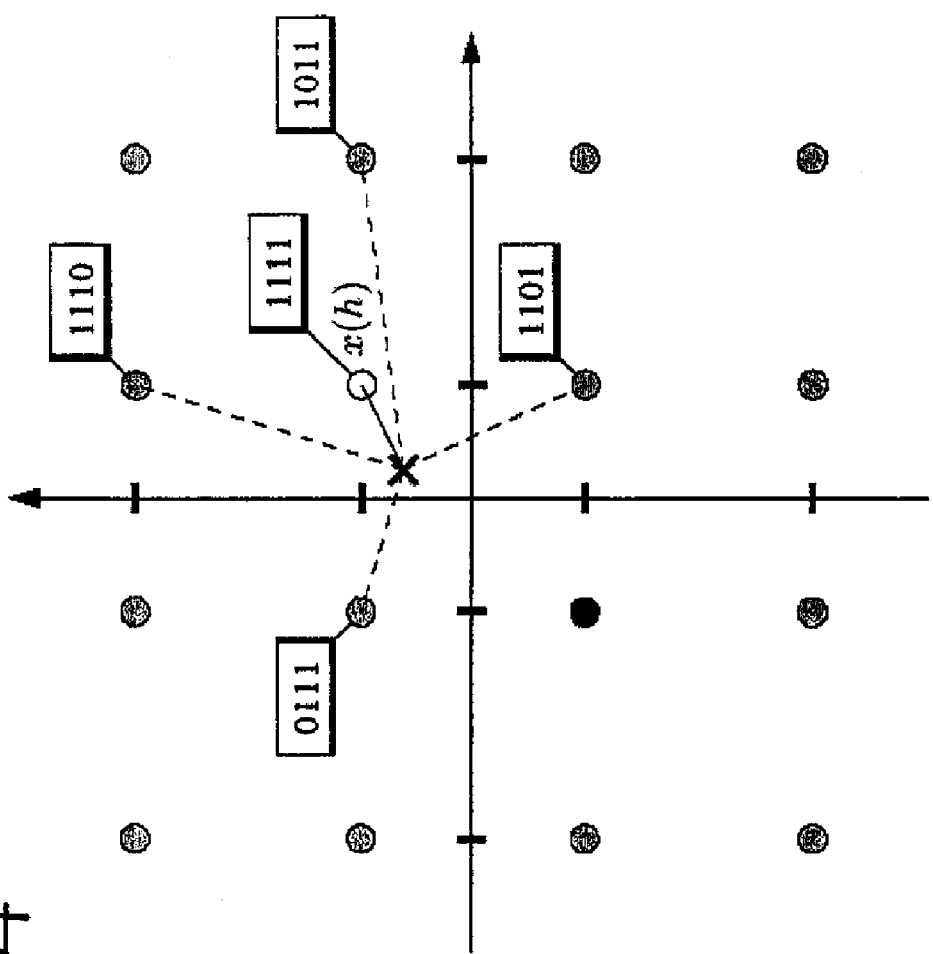
FIG. 4 shows an example of definition of the metrics with choice of the subset of symbols based upon minimum distance according to an embodiment.
Figure 5:
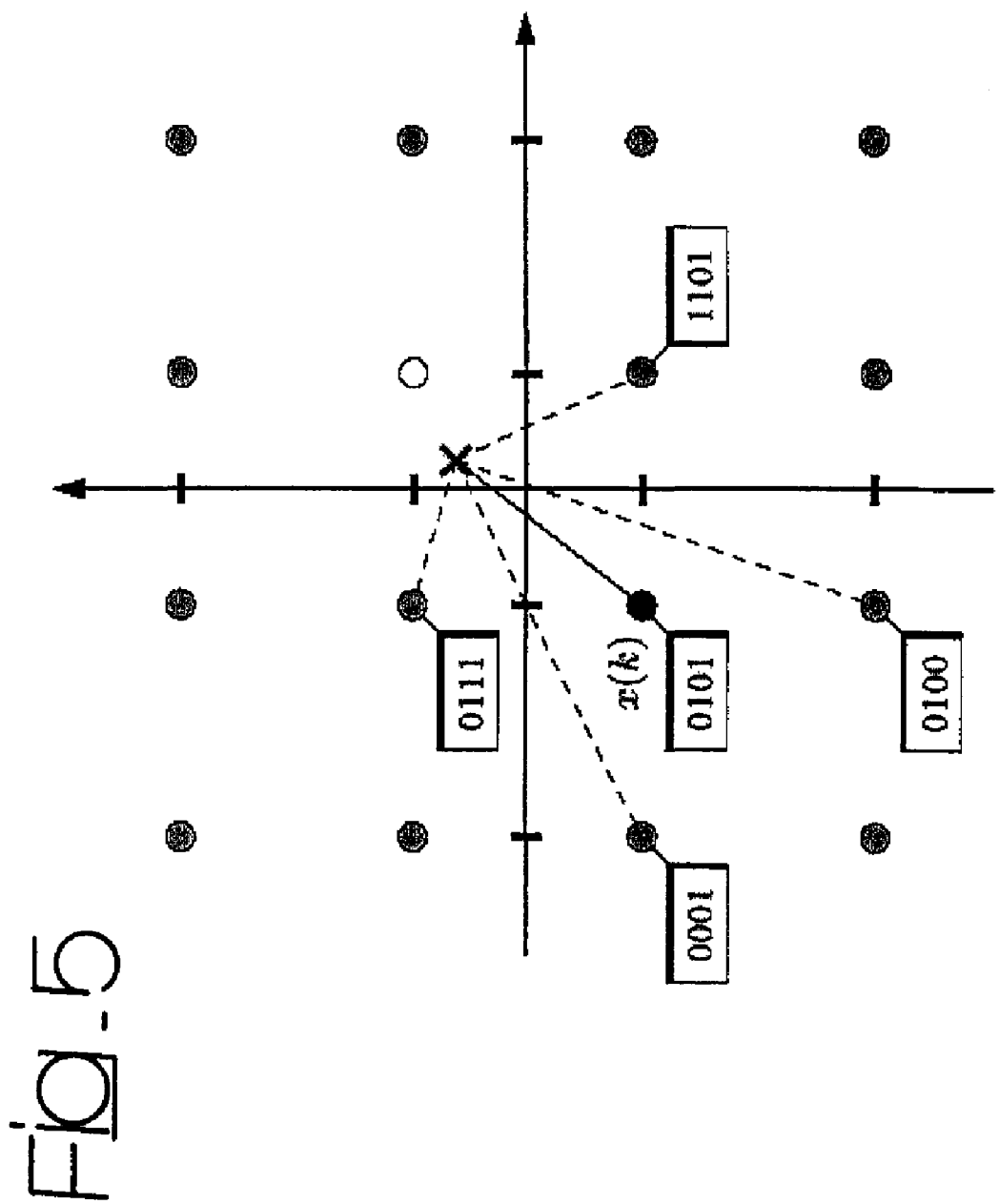
FIG. 5 shows an example of definition of the metrics with choice of the subset of symbols based upon maximum a-posteriori probability (MAP) according to an embodiment.

FIGS. 4 and 5 illustrate an example that shows the application of the distance criterion and of the a-priori-probability criterion, respectively.

For reasons of simplicity, a de-normalized 16-QAM constellation has been used in the examples, even though a considerable reduction of complexity can be appreciated in the case of the 64-QAM constellation.

In both FIG. 4 and FIG. 5, the t-th estimated symbol $\hat{x}_t$ at output from the detector is indicated by a cross. Instead, indicated by a white circle is the symbol x(h) (in the example, 1+j) having the minimum distance from the estimated symbol $\hat{x}_t$ and indicated by a black circle is the symbol x(k) (in the example, −1−j) having associated therewith the maximum a-posteriori probability.

On the basis of the distance criterion, if x(h) is the point closest to $\hat{x}_t$, it is also the point closest in the subset x(n), with $n \in B_m(bit_m[x(h)])$ for those symbols that have the m-th bit equal to $bit_m[x(h)]$. For this reason, $\phi_h[\hat{x}_t, \sigma^2_{\hat{x}_t}, \xi_t(i)]$ has been chosen as the only metric explicitly calculated. Furthermore, there remains to be identified for each m=1, 2, ..., M the point closest to $\hat{x}_t$ in the subset $$B_m(\overline{bit_m[x(h)]})$$

of those symbols having the m-th bit different from $bit_m[x(h)]$.

Thanks to the Gray-mapping properties, these points belong to the same row (column) of x(h) if the m-th bit steers the real (imaginary) part of the points of the constellation, as illustrated in FIG. 4. These other metrics can be calculated using the differential method described hereinafter.

The a-priori-probability criterion is very similar to the preceding one, as illustrated in FIG. 5. In this case, the symbol with the maximum a-priori probability is designated by x(k). Hence, it is moreover the symbol in the subset $B_m$ ($bit_m[x(h)]$ with the highest a-priori probability, for each m=1, 2, ..., M. Consequently, $\phi_k[\hat{x}_t, \sigma_{\hat{x}_t}^2, \xi_t(i)]$ is the only metric that has been directly determined. The other M metrics are calculated through the differential method proposed hereinafter and regard the symbol x(n), with $$n \in B_m(\overline{bit_m[x(k)]})$$

and maximum a-priori probability. Said symbols are the ones having the m-th bit complemented and the other bits unchanged.

Finally, described in what follows is the calculation of the metrics based upon the differential method.

If we look at Eq. (47) we shall note that it is made up of two terms: one corresponding to the distance between $\hat{x}_t$ and x(n) and the other expressing the a-priori probability of x(n). This method provides a simple way for computing these two terms separately so as to use them as specified in formula (50).

Figure 6:
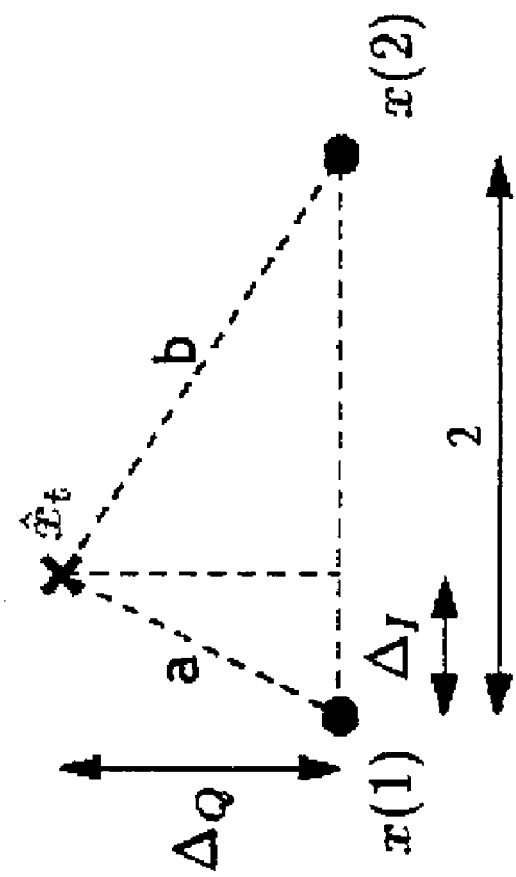
FIG. 6 shows an example of calculation of the distances between two points of a constellation with the mean power not normalized to unity according to an embodiment.

The first term is calculated as described in what follows. With reference to FIG. 6, the cross identifies an estimated symbol $\hat{x}_t$ at output from the detector, whilst the black circles indicate two adjacent QAM symbols x(1) and x(2), aligned horizontally (with $\Im[x(1)]=\Im[x(2)]$).

The constellation is considered de-normalized in such a way that the distances between the symbols are equal to 2. Finally, we define $$\Delta_I = \Re[\hat{x}_t - x(1)] \quad (55)$$

$$\Delta_Q = \Im[\hat{x}_t - x(1)] \quad (56)$$

and assuming that the squared distance $a^2 = |\hat{x}_t - x(1)|^2 = \Delta_I^2 + \Delta_Q^2$ is known, it follows that $b^2 = |\hat{x}_t - x(2)|^2$ can be obtained by applying the Pythagorean theorem as $$b^2 = (2 - \Delta_I)^2 + \Delta_Q^2 \quad (57)$$
$$= 4 + \Delta_I^2 - 4\Delta_I + \Delta_Q^2$$
$$= (\Delta_I^2 + \Delta_Q^2) + 4 - 4\Delta_I$$
$$= a^2 + 4 - 4\Delta_I$$

with $\Re[x(2)] > \Re[x(1)]$.
If $\Re[x(2)] < \Re[x(1)]$, then it follows that $$b^2 = a^2 + 4 + 4\Delta_I \quad (58)$$

Hence, given the squared distance $a^2$, it is possible to obtain the squared distance $b^2$ of an adjacent point by adding the differential term $4 \pm 4\Delta_I$.

Similar equations can be deduced also in the case of two vertically aligned symbols ($\Re[x(1)] = \Re[x(2)]$). The expression for $b^2$ generalized to two non-adjacent QAM symbols is the following:

$$b^2 = \begin{cases} a^2 + 4p^2 - 4p\Delta_I, & \begin{array}{l}\Re[x(1) - x(2)] = 2p \\ \Im[x(1) - x(2)] = 0\end{array} \\ a^2 + 4p^2 - 4p\Delta_Q, & \begin{array}{l}\Re[x(1) - x(2)] = 0 \\ \Im[x(1) - x(2)] = 2p\end{array} \end{cases} \quad (59)$$

where $p \in Z$.

In order to simplify the a-priori terms of the constellation of symbols x(n), as emerges from Eq. (47), it is possible to exploit once again the Gray-mapping properties.

The above term can be obtained by summing the a-priori value of the symbol adjacent to the symbol x(n) to the LLR (with appropriate sign) corresponding to the only bit position for which they differ (or via the sum of a number of LLRs if they are not adjacent).

In conclusion, all the metrics required by the distance criterion and by the a-priori-probability criterion can be calculated starting from a known metric.

The other metrics are obtained simply by adding two terms, which correct the two parts of expression (47). Table 3 compares the computational costs per data bit of the classic de-mapping method (A) and the low-cost de-mapping mapping method (B) in a system with T=2 and R=3.

TABLE 3

|  | 16-QAM | | 64-QAM | |
| --- | --- | --- | --- | --- |
|  | A | B | A | B |
| MUL | 20 | 7.5 | 46.7 | 6.3 |
| SUM | 60 | 17 | 196 | 16 |
| DIV | 0.5 | 0.5 | 0.3 | 0.3 |
| EXP | 0 | 0 | 0 | 0 |
| CMP | 28 | 8 | 124 | 8 |

Finally, presented hereinafter are some numeric results, obtained from simulations.

Figure 7:
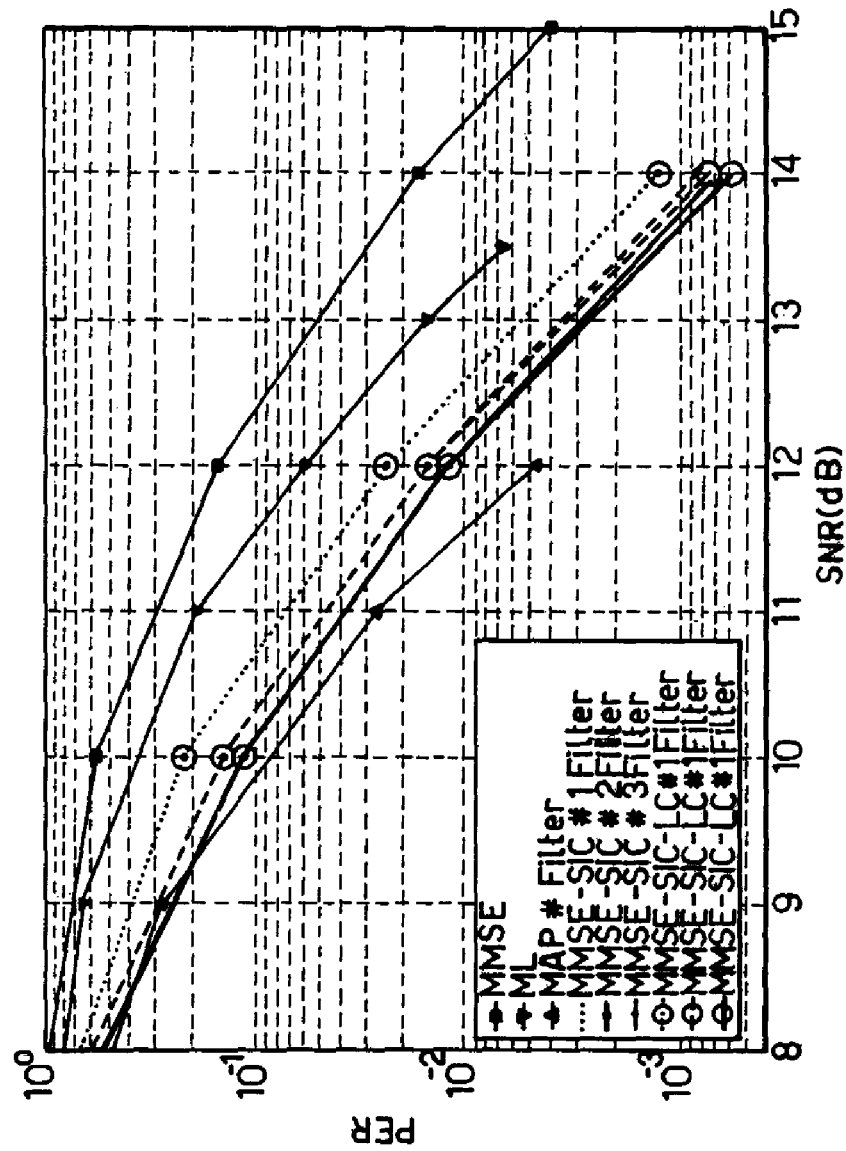
FIG. 7 shows a graph that gives the performance of various systems with a 16-QAM Gray mapping according to an embodiment.
Figure 8:
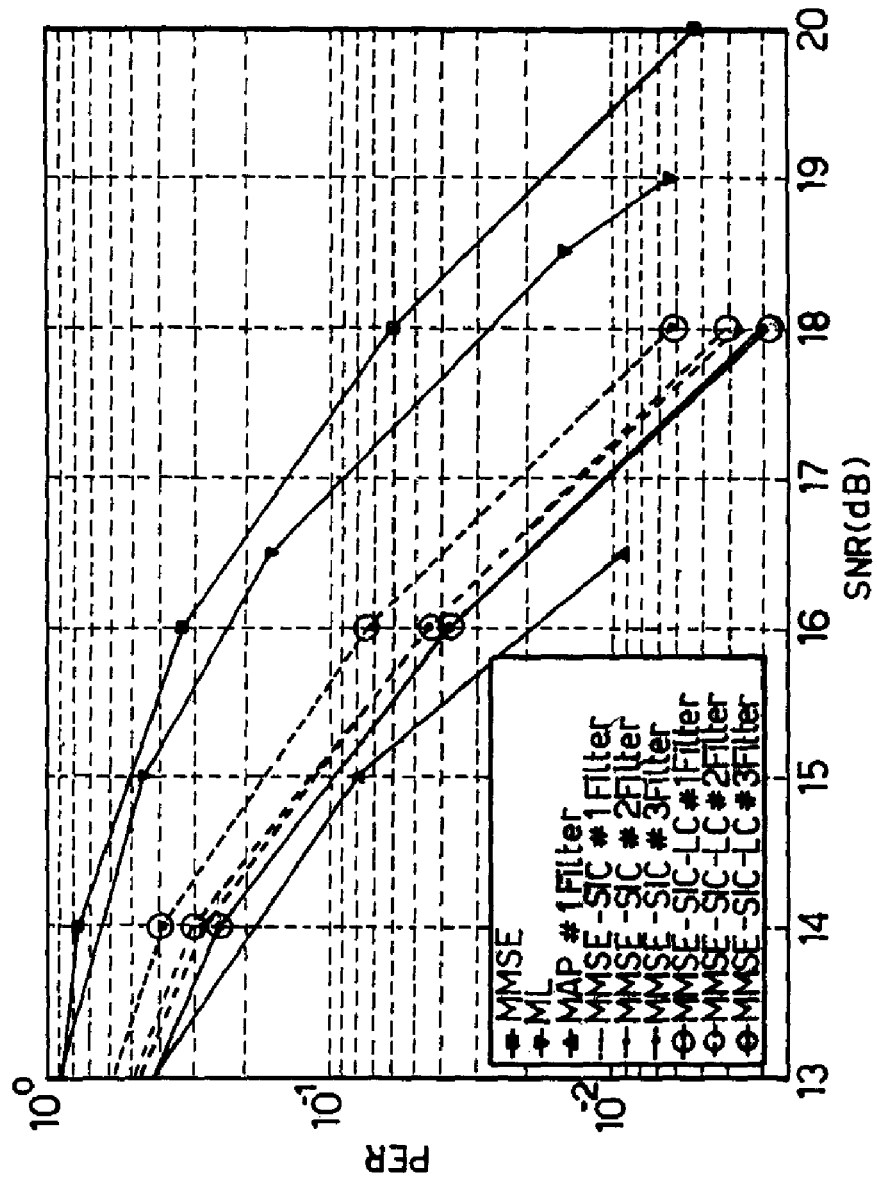
FIG. 8 shows a graph that gives the performance of various systems with a 64-QAM Gray mapping according to an embodiment.

A comparison between the classic and low-complexity iterative decoding and detection schemes appears in Table 4 and in FIGS. 7 and 8. The parameters according to which the two solutions are compared are based upon the total computational cost and upon the performance results, respectively. The data appearing in Table 4 represent the average number of mathematical operations between real numbers, such as sums (SUM), subtractions (SUB), multiplications (MUL), divisions (DIV), and comparisons (CMP) per processed data bit.

TABLE 4

|  | 16-QAM | | 64-QAM | |
| --- | --- | --- | --- | --- |
|  | A | B | A | B |
| MUL | 366.8 | 88.5 | 590.1 | 65.8 |
| SUM | 736.6 | 485.4 | 1035.3 | 473 |
| DIV | 8.5 | 8.5 | 7 | 7 |
| EXP | 4 | 4 | 4 | 4 |
| CMP | 446 | 406 | 639.3 | 407.3 |

Whereas the initial stage for the MMSE calculation has approximately the same computational cost for both the classic scheme and the low-complexity scheme, the subsequent ones can benefit from the reduction of complexity introduced by the block described previously. Two turbo iterations and one SOVA decoding have been considered with a sliding-window approach so as to avoid having to wait for the entire W-LAN-encoded packet to arrive before starting the channel-decoding operation. The size of the window was selected equal to the length of five constraint-length bits.

In the last iteration, the computational cost for the Viterbi method was considered instead of the computational cost of the SOVA method because, in the case of the Viterbi method, only a hard decision on the bits is made. From an examination of the data regarding sums (SUM) and comparisons (CMP), it may be noted that the number of these operations is not so notably reduced by the low-complexity approach as compared to the classic approach, as occurs, instead, in the case of multiplications (MUL) and divisions (DIV). This occurs because the sums (SUM) and comparisons (CMP) are involved a large number of times also in the SOVA decoding operation, which is common to both of the schemes under comparison.

FIGS. 7 and 8 show the performance curves of the classic and low-complexity receiver architectures, regarding systems with 2×3 antennas for 16-QAM constellation and 64-QAM constellation, respectively. Appearing, moreover, in both figures is the performance obtained by applying the optimum MAP technique instead of the MMSE method. As may be seen, the low-complexity method, which exploits the MMSE-SIC approach does not present any degradation in the performance as compared to the classic approach for all the iterations considered. The gain of the second iteration is approximately 2.1 dB in the case of the 16-QAM constellation and 2.3 dB in the case of the 64-QAM constellation, considering a packet error rate (PER) of $10^{-2}$.

Furthermore, more than three iterations do not seem to be convenient given that the incremental gain for the iterations subsequent to the second is not significant. However, one may use more than three iterations.

A processor or other circuit may execute software that causes the processor to implement one or more of the above-described embodiments, and such a processor may be included in an electronic system such as a computer with wireless capability or wireless router.

Consequently, without prejudice to the principle of the present disclosure, the details of implementation and the embodiments may vary, even significantly, with respect to what is described and illustrated herein purely by way of non-limiting example, without thereby departing from the scope of the present disclosure.

The invention claimed is:

1. A method in a receiver for decoding a signal encoded with a mapping with different configurations in a real part and an imaginary part of the signal, comprising:
performing in the receiver a soft estimation of said signal to identify in the signal at least one symbol having a real part and an imaginary part;
decoding in the receiver the real part and the imaginary part of said signal separately; and
recovering the at least one symbol by calculating an error based upon interference between the soft-estimated real part and the soft-estimated imaginary part.

2. The method according to claim 1, wherein said decoding comprises:
carrying out a Minimum-Mean-Square-Error (MMSE) detection that minimizes the mean-square error between said encoded signal and the result of said soft estimation.

3. The method according to claim 1, wherein said signal is encoded according to a Gray mapping.

4. The method according to claim 1, wherein said signal is encoded with two Quadrature-Amplitude-Modulation (QAM) mappings.

5. The method according to claim 1, wherein said encoded signal is transmitted on a selective Multiple-Input/Multiple-Output (MIMO) channel.

6. The method according to claim 1, wherein said encoded signal is multiplexed with an Orthogonal-Frequency-Division-Multiplexing (OFDM) technique.

7. A non-transitory computer-readable medium including computer-executable instructions for implementing the method according to claim 1.

8. A method, comprising:
transmitting an encoded signal from a plurality of antennas;
performing in a receiver a soft estimation of said signal transmitted by each of said plurality of antennas to establish a signal having at least one symbol having a real part and an imaginary part;
decoding in the receiver the real part and the imaginary part of said signal separately; and
cancelling, using the results of said soft estimation, an interference produced on the signal transmitted from each of said plurality of antennas by the signal transmitted from the other antennas of said plurality of antennas.

9. A system, comprising:
a transmitter configured for transmitting a signal encoded with a mapping with different configurations in a real part and an imaginary part of the signal; and
a receiver configured for performing a soft estimation of said signal to identify in the signal at least one symbol having a real part and an imaginary part, and decoding the real part and the imaginary part of said signal separately and configured for recovering the at least one symbol by calculating an error based upon interference between the soft-estimated real part and the soft-estimated imaginary part.

10. The system according to claim 9, wherein said receiver comprises:
a Minimum-Mean-Square-Error (MMSE) detector configured for minimizing the mean-square error between said encoded signal and the result of said soft estimation.

11. The system according to claim 9, wherein said transmitter is configured for transmitting signals encoded according to a Gray mapping.

12. The system according to claim 9, wherein said transmitter is configured for transmitting signals encoded with two QAM mappings.

13. The system according to claim 9, wherein said transmitter is configured for transmitting encoded signals on a selective Multiple-Input/Multiple-Output (MIMO) channel.

14. The system according to claim 9, wherein said transmitter is configured for transmitting encoded signals multiplexed with an Orthogonal-Frequency-Division-Multiplexing (OFDM) technique.

15. A system, comprising:
a transmitter having a plurality of antennas configured for transmitting a signal encoded with a mapping with different configurations in a real part and an imaginary part of the signal; and a receiver comprising a soft decoder for:
performing a soft estimation of the signal transmitted by each of said plurality of antennas to identify in the signal at least one symbol having a real part and an imaginary part;
decoding the real part and the imaginary part of said signal separately; and
cancelling, using the results of said soft estimation, an interference produced on the signal transmitted from each of said plurality of antennas by the signal transmitted from the other antennas of said plurality of antennas.

16. A receiver for decoding a signal encoded with a mapping with different configurations in a real part and an imaginary part of the signal, said receiver comprising:
a decoder for performing a soft estimation of said signal to identify at least one symbol having a real part and an imaginary part, and decoding the real part and the imaginary part of said signal separately and for recovering the at least one symbol by calculating an error based upon interference between the soft-estimated real part and the soft-estimated imaginary part.

17. The receiver according to claim 16, comprising:
a Minimum-Mean-Square-Error detector configured for minimizing the mean-square error between said encoded signal and the result of said soft estimation.

18. A receiver for decoding a signal transmitted from a plurality of antennas and encoded with a mapping with different configurations in a real part and an imaginary part of the signal, said receiver comprising:
a decoder operable to:
perform a soft estimation of said signal transmitted by each of said plurality of antennas,
decode the real part and the imaginary part of said signal separately; and
cancel, using the result of said soft estimation, an interference produced on the signal transmitted from each of said plurality of antennas by the signal transmitted from the other antennas of said plurality of antennas.

19. A method for manipulating a signal in a receiver configured to receive the signal, comprising:
receiving in the receiver a signal that includes data;
generating in the receiver an estimated data symbol from the signal by,
calculating a real part of the estimated data symbol,
calculating an imaginary part of the estimated data symbol separately from the calculating of the real part, and
combining the real and imaginary parts; and
recovering in the receiver the data using the estimated data symbol;
wherein receiving the signal comprises receiving the signal via a transmission path; and
wherein recovering the data comprises,
modifying the estimated data symbol based on a transfer function associated with the transmission path,
generating a difference between an actual received data symbol in the signal and the modified estimated data symbol,
filtering the difference to obtain a filtered data symbol, and
recovering the data from the filtered data symbol;
reconstructing a transmitted data symbol from the recovered data;
calculating an error between the filtered data symbol and the reconstructed transmitted data symbol; and
adjusting a quantity used in the calculating of one of the real and imaginary parts of the estimated data symbol to reduce the error.

20. The method of claim 19 wherein the receiving comprises receiving the signal with at least one of multiple receiving antennas.

21. The method of claim 19 wherein generating the estimated data symbol comprises:
generating an estimated interference component representing interference on the signal from other signals carrying other data symbols;
subtracting the estimated interference component from the signal to generate a reduced-interference received signal; and
generating the estimated data symbol from the reduced-interference signal.

22. A method for manipulating a signal in a receiver configured to receive the signal, comprising:
receiving in the receiver a signal that includes data;
generating in the receiver an estimated data symbol from the signal by,
calculating a real part of the estimated data symbol,
calculating an imaginary part of the estimated data symbol separately from the calculating of the real part, and
combining the real and imaginary parts; and
recovering in the receiver the data using the estimated data symbol;
wherein receiving the signal comprises receiving the signal via multiple transmission paths; and
wherein recovering the data comprises,
modifying the estimated data symbol based on transfer functions respectively associated with the transmission paths,
generating a difference between an actual received data symbol in the signal and the modified estimated data symbol,
filtering the difference to obtain a filtered data symbol, and
recovering the data from the filtered data symbol;
reconstructing a transmitted data symbol from the recovered data;
calculating a mean-square error between the filtered data symbol and the reconstructed transmitted data symbol; and
adjusting a quantity used in the calculating of one of the real and imaginary parts of the estimated data symbol to reduce the mean-square error.

23. A method for manipulating a signal in a receiver configured to receive the signal, comprising:
receiving in the receiver a signal that includes data;
generating in the receiver an estimated data symbol from the signal by,
calculating a real part of the estimated data symbol,
calculating an imaginary part of the estimated data symbol separately from the calculating of the real part, and
combining the real and imaginary parts; and
recovering in the receiver the data using the estimated data symbol;
wherein receiving the signal comprises receiving the signal via a transmission path;
wherein recovering the data comprises,
modifying the estimated data symbol based on a transfer function associated with the transmission path, generating a difference between an actual received data symbol in the signal and the modified estimated data symbol, filtering the difference to obtain a filtered data symbol, and recovering the data from the filtered data symbol;

reconstructing a transmitted data symbol from the recovered data;

calculating an error between the filtered data signal and the reconstructed transmitted data symbol;

calculating from the error an estimated interference on the signal;

reducing interference on the signal based on the estimated interference; and wherein generating the estimated data symbol comprises generating the estimated symbol from the reduced-interference signal.

24. A method for manipulating a signal in a receiver configured to receive the signal, comprising:

receiving in the receiver a signal that includes data;

generating in the receiver an estimated data symbol from the signal by, calculating a real part of the estimated data symbol, calculating an imaginary part of the estimated data symbol separately from the calculating of the real part, and combining the real and imaginary parts; and recovering in the receiver the data using the estimated data symbol;

wherein receiving the signal comprises receiving the signal via multiple transmission paths;

wherein recovering the data comprises, modifying the estimated data symbol based on transfer functions respectively associated with the transmission paths, generating a difference between an actual received data symbol in the signal and the modified estimated data symbol, filtering the difference to obtain a filtered data symbol, and recovering the data from the filtered data symbol;

reconstructing a transmitted data symbol from the recovered data;

calculating an error between the filtered data signal and the reconstructed transmitted data symbol;

calculating from the error an estimated interference on the signal;

subtracting the estimated interference from the signal to generate a reduced-interference signal; and wherein generating the estimated data symbol comprises generating the estimated symbol from the reduced-interference signal.

25. A receiver, comprising:

an antenna configured to receive a signal that includes data;

a detector configured to generate an estimated data symbol from the received signal by, calculating a real part of the estimated data symbol, calculating an imaginary part of the estimated data symbol separately from the calculating of the real part, and combining the real and imaginary parts; and a data-recovery circuit configured to recover the data using the estimated data symbol and using an error calculated from interference between the estimated real part and the estimated imaginary part.

26. An electronic system, comprising:

a receiver, including, an antenna configured to receive a signal that includes data, a detector configured to generate an estimated data symbol from the received signal by, calculating a real part of the estimated data symbol, calculating an imaginary part of the estimated data symbol separately from the calculating of the real part, and combining the real and imaginary parts, and a data-recovery circuit configured to recover the data using the estimated data symbol and using an error calculated from interference between the estimated real part and the estimated imaginary part.

* * * * *

UNITED STATES PATENT AND TRADEMARK OFFICE
CERTIFICATE OF CORRECTION

PATENT NO. : 8,069,399 B2
APPLICATION NO. : 11/450920
DATED : November 29, 2011
INVENTOR(S) : Fabio Osnato et al.

Page 1 of 1

It is certified that error appears in the above-identified patent and that said Letters Patent is hereby corrected as shown below:

- In Claim 6, Column 16, Line 15 of the patent, please change the text "signalis multiplexed with an Orthogonal-Frequency-Devi-" to --signal is multiplexed with an Orthogonal-Frequency-Devi- --.

Signed and Sealed this
Twenty-fourth Day of April, 2012

David J. Kappos
*Director of the United States Patent and Trademark Office*